DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED MAY 6, 1975

934 OG 9

T934,010

LAMINATED ROLL

Michael John Maskornick, Wilmington, Del., assignor to E. I. du Pont de Nemours and Company, Wilmington, Del.

Continuation-in-part of abandoned application Ser. No. 307,952, Nov. 20, 1972. This application May 24, 1974, Ser. No. 473,224

Int. Cl. B32b *27/06*

U.S. Cl. 29—130

No Drawing. 17 Pages Specification

A very useful laminated roll which has as its essential components (A) a cylindrical metallic core, (B) a layer of adhesive adhering to and substantially surrounding said core and (C) a perfluorinated elastomer layer adhering to and substantially surrounding said adhesive layer, said perfluorinated elastomer being an elastomeric copolymer of tetrafluoroethylene, a perfluoroalkyl perfluorovinyl ether and optionally a suitable functionally substituted perfluoroalkyl perfluorovinyl ether. Rolls of this invention have beneficial utility as adhesive application rolls, textile finishing rolls, fuser rolls for office copying machines, and the like.